(12) United States Patent
Watson et al.

(10) Patent No.: US 11,429,435 B1
(45) Date of Patent: Aug. 30, 2022

(54) DISTRIBUTED EXECUTION BUDGET MANAGEMENT SYSTEM

(71) Applicant: Amazon Technologies, Inc., Seattle, WA (US)

(72) Inventors: Ryan F. Watson, Seattle, WA (US); Douglas Stewart Laurence, Mercer Island, WA (US); Matthew Graham Baldwin, Rocklin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 238 days.

(21) Appl. No.: 16/781,864

(22) Filed: Feb. 4, 2020

(51) Int. Cl.
*G06F 9/48* (2006.01)
*G06F 9/50* (2006.01)
*G06F 11/14* (2006.01)

(52) U.S. Cl.
CPC .......... *G06F 9/4881* (2013.01); *G06F 9/5038* (2013.01); *G06F 9/5072* (2013.01); *G06F 11/1405* (2013.01)

(58) Field of Classification Search
CPC .... G06F 9/4881; G06F 9/5038; G06F 9/5072; G06F 11/1405
See application file for complete search history.

(56) References Cited

U.S. PATENT DOCUMENTS

| 9,979,617 | B1 | 5/2018 | Meyer |
| 2017/0228290 | A1 | 8/2017 | Maccanti |
| 2017/0357530 | A1 | 12/2017 | Shih |
| 2020/0068684 | A1 | 2/2020 | Ramer |
| 2020/0089545 | A1 | 3/2020 | Ahad |
| 2021/0117093 | A1* | 4/2021 | Song ..................... G06F 3/0604 |

* cited by examiner

*Primary Examiner* — Sisley N Kim
(74) *Attorney, Agent, or Firm* — Knobbe, Martens, Olson & Bear, LLP (57) ABSTRACT

Systems and methods are provided for managing execution budgets for computing tasks in distributed computing systems. Execution budgets may include a budgeted number of operation retries that may be performed by the distributed computing system in response to failure of an operation. Execution budgets may also or alternatively include a budgeted amount of time in which the distributed computing system may perform the operations of a computing task. When a distributed computing system exhausts the execution budget allotted for a computing task, then further execution of the computing task or portions thereof may be terminated.

18 Claims, 5 Drawing Sheets

DISTRIBUTED EXECUTION BUDGET MANAGEMENT SYSTEM

BACKGROUND

Computing devices can utilize communication networks to exchange data. Companies and organizations operate communication networks that interconnect computing devices to support operations or to provide services to third parties. For example, a data center may include a number of interconnected computing systems to provide computing resources to internal and/or external users. In some implementations, performance of a computing task involves execution of multiple operations, and individual operations may be independent or dependent upon any of the other operations. Execution of the operations may be distributed among multiple physical and/or virtual computing devices in a single data center or across multiple data centers.

DETAILED DESCRIPTION

The present disclosure is directed to implementation and management of execution budgets for computing tasks in distributed computing systems. Execution budgets may include a budgeted number of operation retries that may be performed by the distributed computing system in response to failure of an operation, such as failure to connect to another computing component, failure to receive a requested response from another computing component, occurrence of a timeout event, etc. Execution budgets may also or alternatively include a budgeted amount of time in which the distributed computing system may perform the operations of a computing task. When a distributed computing system exhausts the execution budget allotted for a computing task, then further execution of the computing task or portions thereof may be terminated.

Distributed computing systems may be configured to perform computing tasks—such as execution of applications—as sets of individual operations distributed among any number of physical or virtual computing devices. Execution of the individual operations may be performed by different services, and each of the services may be implemented on one or more computing devices. Therefore, a computing task that involves performance of a number of different operations may be distributed across multiple services implemented by multiple different computing devices. The services may operate serially, in parallel, or asynchronously as needed. In addition, the services may operate independently, or they may be chained together such that the output of some services is provided as input to other services or otherwise affects the operation of other services. Thus, execution of a single application may be represented as an application graph of different application programming interface ("API") calls to different services, any of which may make calls to other services in a subgraph, and so on. In some distributed computing systems, each service may provide execution of a single operation or small number of operations (e.g., a computing task with 50 operations may be distributed among 50 different services). Such services may be referred to as "microservices." A distributed computing system may implement dozens, hundreds, thousands, or more individual microservices. The execution of different applications may include the use of any or all of the of the microservices provided by the distributed computing system. In some cases, the microservices may be shared among any number of different applications.

Services and microservices (referred to herein under the umbrella term "services" for convenience) may fail for a variety of reasons, such as failure to connect to another component (e.g., another service), errors encountered during processing (e.g., exceptions, malformed input, etc.), timeout events, and the like. When a failure occurs at a particular service in an application graph, the failure may be passed up the graph to be handled by another service, or the failure may cause termination of the application. To avoid passing the failure to another service or causing application termination, some distributed computing systems permit or require a service to retry a failed operation. A service may retry a failed operation periodically after a predetermined or dynamically determined period of time. For example, the service may use a back-off algorithm, such as exponential back-off, to determine the period of time to wait before retrying the failed operation (e.g., n milliseconds, minutes, hours, etc., wherein n is a positive number). However, in a distributed system with a large number of services, and an application graph in which multiple services rely upon the successful completion of other services, a failure at one service (or failures at a small number of services) may cause failures other services, and may then cascade throughout the application graph. This cascade of failures may result in a relatively large number of retries being performed at different levels of the application graph. In some cases, the total volume of retries may reach a point where the entire distributed computing system, or sets of services provided by the distributed computing system, do little other than retry failed operations. This condition—which may be referred to as a "retry storm"—can degrade the performance of some or all of the distributed computing system, up to and including localized or system-wide outages.

In distributed computing systems with large numbers of services, it can also be difficult or impractical to ensure and enforce certain operational parameters across the entire system, resulting in individual services using different and potentially discordant strategies for setting the operational parameters. For example, a first service may be configured to wait a period of time (e.g., 5 milliseconds (ms)) for a second service to execute before timing out or otherwise assuming the second service has failed. The second service may be configured to call a third service during the course of execution, and may be configured to wait a longer period of time (e.g., 10 ms) for the third service to execute. In this scenario, the first service may fail waiting for the second service to complete execution, even in cases when the second service (and dependent services such as the third service) are executing normally within their operational parameters.

Some aspects of the present disclosure address the issues described above, among others, through use of a distributed execution budget to manage the retries of failed operations in a distributed computing system. The distributed execution budget may be an execution retry budget for an entire computing task. As described above, when an application performs a computing task in a distributed computing environment, the application may call one or more services to perform operations, each of the services may call zero, one, or more services to perform additional operations, and so on, resulting in an application graph of services calling other services. An execution retry budget specifying a maximum quantity of retry operations for the entire application graph may be set at the beginning of the computing task. Collectively, all of the services in the application graph may only retry failed operations up to the maximum quantity specified by the execution retry budget. For example, if the execution retry budget specifies a maximum of 10 retries, then the total number of retries by all of the services in the application graph—which may include dozens, hundreds, or more individual services—may not exceed 10. Such an execution retry budget can be used to impose a limit on the total number of retries across the entire application graph, thereby reducing or eliminating the risk of a "retry storm" occurring when one or more services fail within a given period of time. A cascade of failures across the application graph—and across the distributed computing system as a whole—can be cut short or avoided altogether once the execution retry budgets for the active applications are exhausted. In addition, the execution retry budget can be used to limit the amount of perceived latency for a given computing task before the task is terminated. Thus, a user or separate application that has initiated the computing task may be informed of the failure of the computing task in a timely manner and can take remedial actions or initiate its own retry, without waiting an unacceptable duration of time for the computing task to complete or fail.

In order to manage the retries in real-time across the entire application graph, the execution retry budget may be allocated among different branches of the graph. For example, if the application graph begins at a root service that calls two supporting services to execute in parallel, the execution retry budget may be split into two budgets: one for each supporting service. Assuming the root service has not used any retries to initiate execution of the two supporting services, the execution retry budget (e.g., 10 retries) may be allocated among the two supporting services. The allocation may be equal (e.g., 5 going to each supporting service). In some embodiments, the allocation may be unequal (e.g., 6 going to one service, 4 going to another service) depending upon the needs of the supporting services (e.g., the number of additional services to be called by the supporting service, historical analysis of failures and retires for the services, etc.). If a service only calls one service at a time and waits for the called service to complete before calling another service or finishing its own execution, then the entire execution retry budget—or the portion of the execution retry budget allocated to the calling service—may be passed to the called service. The process of allocation and budget passing may be repeated as needed for each subsequently called service in the application graph. When a service experiences a failure and has no remaining retries in its execution retry budget, the service may be prohibited from attempting further retries of the failed operation. Instead, the service may raise an error, throw an exception, or perform some other method of notifying the service from which it was called that a failure has occurred.

Additional aspects of the present disclosure relate to use of a distributed execution budget specifying a maximum duration of time within which a computing task is to execute. Such a distributed execution budget may be referred to as an execution duration budget. The execution duration budget for an entire application graph may be set at the beginning of the computing task. Collectively, all of the services in the application graph may be required to complete certain operations, such as the establishment of network connections to other services or the execution of functions by the service, within the maximum duration of time starting when the computing task is initiated (or when the first service is called, or at some other event). For example, if the execution duration budget specifies a maximum of 10 seconds, then all of the services in the application graph—which may include dozens, hundreds, or more individual services—must complete the relevant operations within 10 seconds of the computing task being initiated. Such an execution duration budget can be used to impose a limit on the total execution time of an entire application graph, thereby reducing or eliminating the risk of a "retry storm" occurring when one or more services fail within a given period of time. A cascade of failures across the application graph—and across the distributed computing system as a whole—can be cut short once the execution durations for the active applications are exhausted. In addition, the execution duration budget can be used to limit the amount of perceived latency for a given computing task before the task is terminated. Thus, a user or separate application that has initiated the computing task may be informed of the failure of the computing task in a timely manner and can take remedial actions or initiate its own retry, without waiting an unacceptable duration of time for the computing task to complete or fail.

In order to manage the execution duration budget in real-time across the entire application graph, each service may track the amount of time that the service it has called has consumed performing relevant operations (e.g., establishing connections and/or performing functions, etc.), and subtract that execution time from the execution duration budget with which the called service began. For example, when a first service calls a second service to perform an operation, the first service may subtract the amount of time that it has been executing from the execution duration budget with which it began, and then pass the remaining execution duration budget to the second service. The second service may perform its operations, subtract its total execution time from the execution duration budget passed by the first service, and then pass the remaining execution duration budget to a third service, or back to the first service (or otherwise back up the application graph) if there is no other service to be called. If a service calls two or more services to execute in parallel or asynchronously, the calling service may pass to each of the called services the entire execution duration budget remaining when the called services are called. This budget handling may be used when the total execution time of the computing task is important, rather than the execution time of a particular service. When a service does not finish executing before the expiration of the execution duration budget with which it began, the service may be prohibited from further operation. Instead, the service may raise an error, throw an exception, or perform some other method of notifying the service from which it was called that a failure has occurred.

Further aspects of the present disclosure relate to increasing the distributed execution budget in response to certain events or satisfaction of certain criteria. The distributed execution budget may be increased to provide additional retries or time. In some embodiments, the distributed execution budget may be increased to preserve work that has been performed successfully. For example, a computing task may have reached a point where the amount of work that has been completed is significant and it is undesirable to start over or otherwise discard the work, even though some (or most, or all) of the distributed execution budget has been consumed. In this case, services may be configured to dynamically increase the remaining distributed execution budget (e.g., add retries or time) to increase the likelihood that the computing task will complete and the significant amount of completed work is not lost. In some embodiments, the distributed execution budget may be set low initially so that a failure or relatively small number of failures at the beginning of the computing task will result in termination of the computing task rather than waiting for exhaustion of a larger distributed execution budget. The distributed execution budget may be increased over time or as operations are completed successfully.

Still further aspects of the present disclosure relate to dynamically adjusting operation of a service based on the remaining distributed execution budget available to the service. When a service consumes a portion of the distributed execution budget allotted to it and has not yet completed execution, the service may adjust its operation in response to a failure. In some embodiments, if a service has attempted to connect to a particular computing device of a called service, has failed to complete the connection, and has used a threshold number of retries to attempt to complete the connection without success, the service may determine to attempt to connect to an alternative computing device of the called service, or a different service altogether. This determination may be made so as not to exhaust the remaining execution budget attempting to connect to a computing device that may be experiencing issues when there may be alternative computing devices that are able to handle the request.

Various aspects of the disclosure will now be described with regard to certain examples and embodiments, which are intended to illustrate but not limit the disclosure. Although aspects of some embodiments described in the disclosure will focus, for the purpose of illustration, on particular examples of services, failures, retries, and distributed execution budget allocation and communication, the examples are illustrative only and are not intended to be limiting. In some embodiments, the systems and methods described herein may be applied to additional or alternative services, failures, retries, distributed execution budget allocation and communication, and the like.

Distributed Computing System

Figure 1:
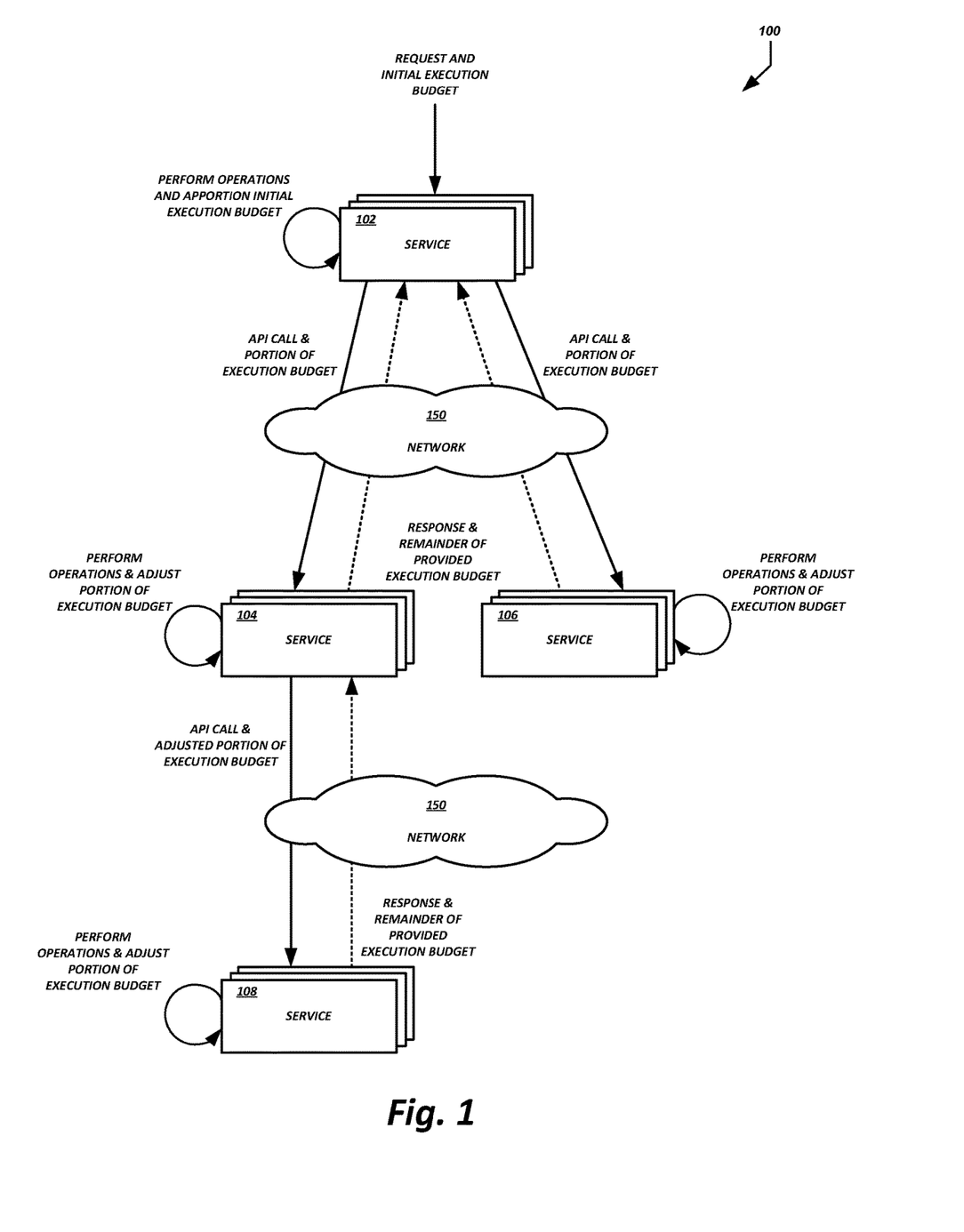
FIG. 1 illustrates a computing environment in which distributed execution budgets may be used according to some embodiments.

FIG. 1 is a block diagram showing a distributed computing system 100, including various computing services 102, 104, 106, 108. The computing services 102, 104, 106, and 108 are also referred to herein simply as "services" for convenience. Individual services 102, 104, 106, 108 may be configured to perform one or more computing operations. A single computing task executed by the distributed computing system 100, such as execution of an application, may involve a combination of the services 102, 104, 106, 108 performing individual operations in contribution to execution of the computing task as a whole.

The services 102, 104, 106, 108 may communicate with each other via one or more communication networks 150. A communication network 150, which is also referred to herein simply as a network 150 for convenience, may be or include a publicly-accessible network of linked networks, possibly operated by various distinct parties, such as the Internet. In some cases, the network 150 may be or include a private network, personal area network, local area network, wide area network, global area network, cable network, satellite network, cellular data network, etc., or a combination thereof, some or all of which may or may not have access to and/or from the Internet.

The components of the distributed computing system 100 may be implemented on one or more physical server computing devices. In some embodiments, individual services 102, 104, 106, 108 or combinations thereof may be implemented on one or more host devices, such as blade servers, midrange computing devices, mainframe computers, or any other computing device configured to provide computing services and resources. For example, a single host device may execute or otherwise host one or more services 102, 104, 106, 108 or some combination thereof. The distributed computing system 100 may include any number of such hosts. Individual services may be implemented as virtual machines, applications, processes, and/or threads within a single host or across multiple hosts. Thus, calls among services may therefore be performed as inter process communications (e.g., messages or shared memory) among different virtual machines, applications, processes, and/or threads within a single host, or as calls across multiple hosts. Communications between services, regardless of the implementation of the different services on the same host or on different hosts, may be generally referred to as "inter service communications." In some embodiments, a distributed computing system 100 may include any combination of such service implementations, and an application graph may include any combination of such service implementations.

In some embodiments, the features and services provided by the distributed computing system 100 may be implemented as web services consumable via one or more communication networks. In further embodiments, the computing services 102, 104, 106, 108 are provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

Figure 2:
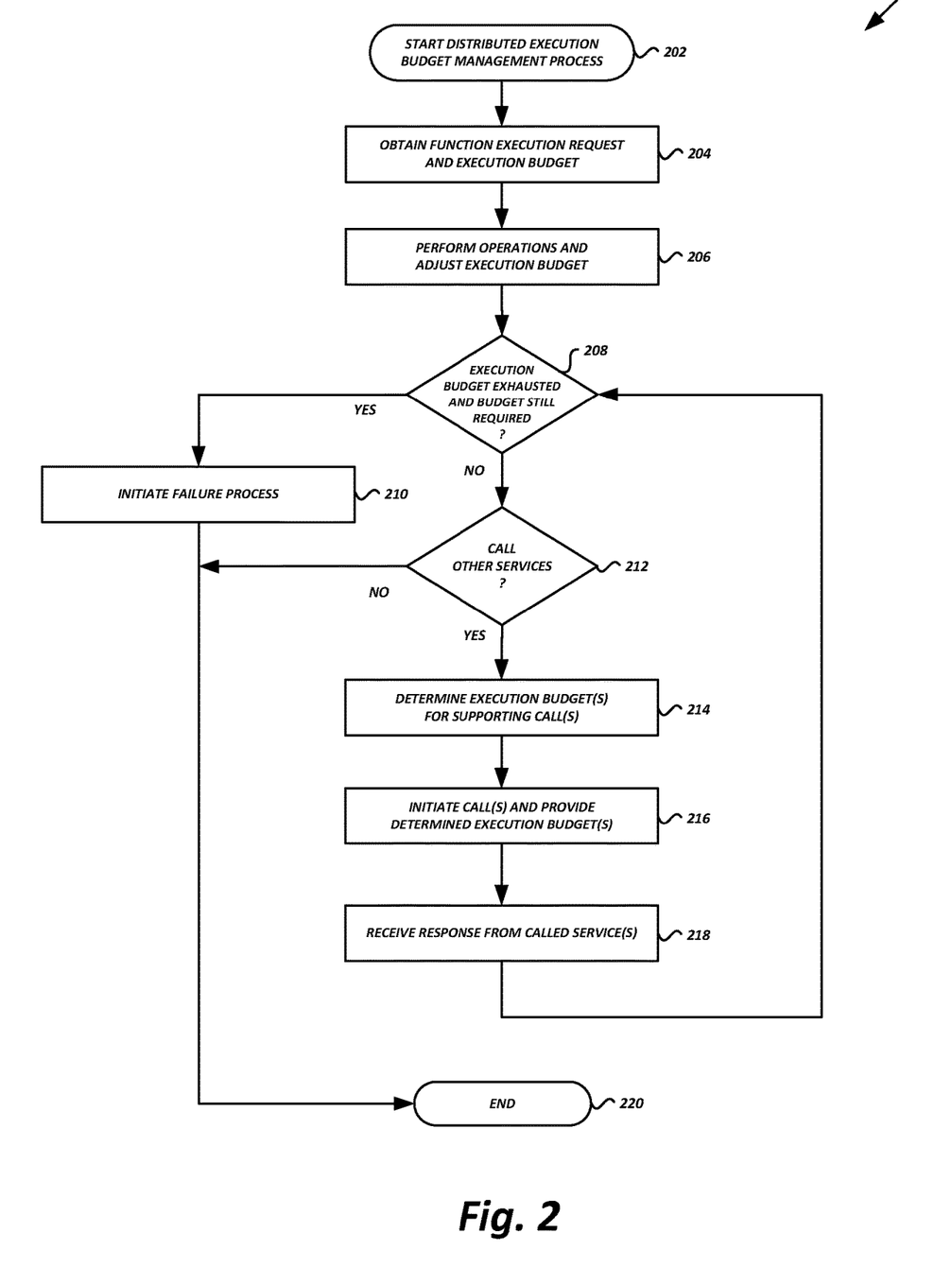
FIG. 2 is a flow diagram of an illustrative process for managing distributed execution budgets according to some embodiments.

In an illustrative embodiment, the distributed computing system 100 may provide an interactive web site to external users. A request for a web page may be received by service 102, which may be a web server. The web server may include any number of individual computing devices configured to receive and respond to requests for web pages. The web server may determine, or be provided with, execution budget data representing a distributed execution budget for the computing task of responding to the request for the web page. The distributed execution budget is also referred to herein simply as an "execution budget" for convenience. The execution budget may be a budget of operation retries that may be performed in response to certain events (e.g., connection failures, timeout events, etc.), a duration of time within which the computing task is to be performed (e.g., the total time from request for web page to response with requested web page), some combination of operation retries and duration of time, etc. While the web server performs its operations, it adjusts the execution budget accordingly to reflect any consumption of the execution budget. For example, the web server may reduce the execution budget to account for any operation retries performed, execution time used, etc. The web server can also provide execution budget data representing the remaining execution budget—or some portion thereof—to other services that it calls to execute functions in support of the computing task. An example of execution budget management is shown in FIG. 2 and described in greater detail below.

In preparing a response to the request for the web page, the web server may determine that recommendations for the user are required. The web server may provide a request to service 104, which may be a recommendation server. Included in the request, or otherwise provided to the recommendation server, may be execution budget data representing the portion of the initial execution budget (e.g., operation retires, duration of time) available to the recommendation server and any supporting services that it calls.

The recommendation server implemented by service 104 may include any number of individual computing devices configured to generate recommendations for a particular user. While the recommendation server performs its operations, it adjusts the execution budget accordingly, and provides execution budget data representing the remaining execution budget—or some portion thereof—to other services that it calls to execute functions in support of the computing task. In preparing a response to the request for recommendations, the recommendation server may determine that information is required about the user for whom the recommendations are being generated. The recommendation server may provide a request to service 108, which may be a database server. Included in the request, or otherwise provided to the database server, may be execution budget data representing the portion of the execution budget (e.g., operation retires, duration of time) that was provided to the recommendation server and is still available or otherwise has been allocated to the database server and any supporting services that it calls.

The database server implemented by service 108 may include any number of individual computing devices configured to store and respond to requests for data. While the database server performs its operations, it adjusts the execution budget accordingly, and provides execution budget data representing the remaining execution budget—or some portion thereof—to other services that it calls to execute functions in support of the computing task. When a response to the request from the recommendation server is ready, the database server may provide the response to the recommendation server including the requested information about the user. In addition, the database server may provide execution budget data representing its remaining execution budget back to the recommendation server. In this way, the remainder of the execution budget that was provided to the database server may be available to perform other operations in connection with the computing task, whether those operations are performed by the recommendation server or some other service.

The recommendation server may use the information received from the database server to generate recommendations, and provide a response to the web server including the requested recommendations. In addition, the recommendation server may provide execution budget data representing its remaining execution budget back to the web server. In this way, the remainder of the execution budget that was provided to the recommendation server may be available to perform other operations in connection with the computing task, whether those operations are performed by the web server or some other service.

The web server may also determine that dynamic content is to be included in the web page, such as breaking news, weather, sports scores, etc. The web server may provide a request to service 106, which may be a dynamic content server. Included in the request, or otherwise provided to the dynamic content server, may be execution budget data representing the portion of the initial execution budget available to the dynamic content server and any supporting services that it calls. For example, the portion of the initial execution budget available to the dynamic content server may be the portion that was returned back from the recommendation server after completion of its operations.

The dynamic content server implemented by service 106 may include any number of individual computing devices configured to dynamically generate content at the time of a request. While the dynamic content server performs its operations, it adjusts the execution budget accordingly, and provides execution budget data representing the remaining execution budget—or some portion thereof—to other services that it calls to execute functions in support of the computing task. The dynamic content server may provide a response to the web server including the requested dynamic content. In addition, the dynamic content server may provide execution budget data representing its remaining execution budget back to the web server.

During the course of the services 102, 104, 106, 108 performing operations, the services may monitor the execution budgets that they have been provided. If at some point during operation a service exhausts an execution budget and requires additional budget (e.g., an additional retry operation or additional time to execute), the service may be prevented from continuing. In this case, the corresponding service may generate a notification, such as an error message, an exception, or the like. The notification may be passed to a calling service and, in some cases, to the user or system that initiated the computing task. If the execution budget is not exhausted (or if it is exhausted and there is no additional execution budget required), then the computing task may complete successfully. In the present example, the web server has finished preparing the requested web page, and provided the web page to the requestor.

Example Distributed Execution Budget Management Routine

FIG. 2 is a flow diagram of an illustrative process 200 for managing a distributed execution budget in a distributed computing system. Portions of the process 200 will be described with further reference to the illustrative data flows and interactions shown in FIGS. 3 and 4.

The process 200 begins at block 202. The process 200 may begin in response to an event, such as when a service of a distributed computing system begins operation. Although portions of the process 200 will be described as being performed by services illustrated in FIGS. 3 and 4, it will be appreciated that the process may be performed by a single computing device or subset of computing devices used to implement a given service. For example, when the process 200 is initiated, a set of executable program instructions stored on one or more non-transitory computer-readable media (e.g., hard drive, flash memory, removable media, etc.) may be loaded into memory (e.g., random access memory or "RAM") of a computing device, such as the computing device 500 shown in FIG. 5. The distributed service instructions 514 shown in FIG. 5 may be loaded into memory 510 of the computing device 500 and executed by one or more processors 502. In some embodiments, the process 200 or portions thereof may be implemented on multiple processors 502 and/or multiple computing devices 500, serially or in parallel.

Figure 5:
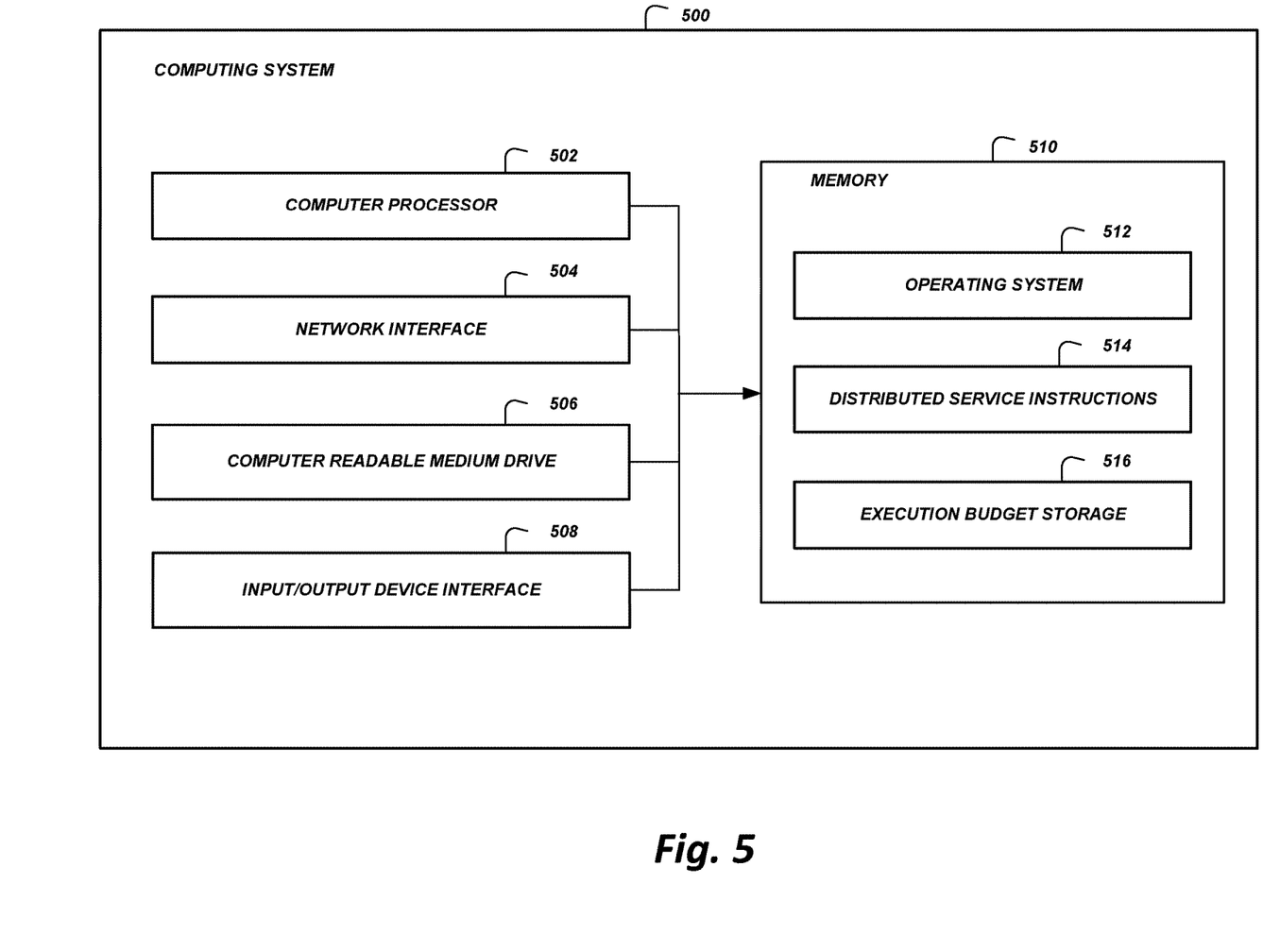
FIG. 5 shows an illustrative computing system configured to implement aspects of the present disclosure according to some embodiments.

At block 204, the computing device 500 can obtain a request to perform a function. The request may be directed to the service generally and assigned to the computing device 500 (e.g., when multiple computing devices are configured to provide the functionality of the service), or the request may be directed to the computing device 500 specifically. The request may include, reference, or otherwise be associated with execution budget data that represents an execution budget allotted to the service and any supporting services that the service calls. In some embodiments, the request may be received as an application programming interface ("API") call, and execution budget data representing the execution budget may be included as a parameter of the call. In some embodiments, the computing device 500 may determine the execution budget after being called, based on a configuration of computing device 500, the service that the computing device is implementing, data obtained from a data store, or the like.

Figure 3:
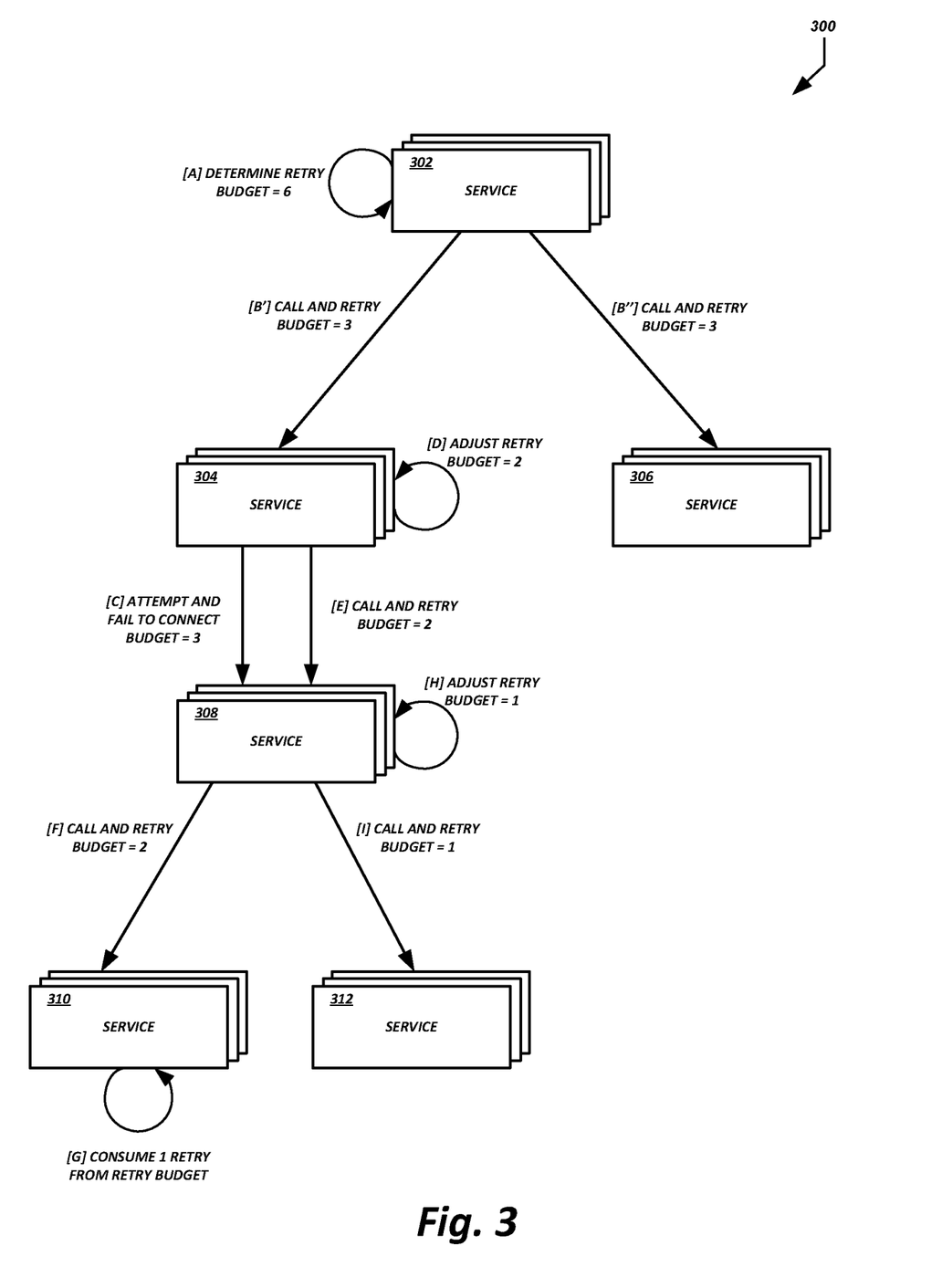
FIG. 3 is a block diagram of illustrative data flows and interactions during execution of a distributed computing task using an execution retry budget according to some embodiments.

As shown in FIG. 3, service 302 can determine at [A] that the execution budget is an execution retry budget with 6 retries. In this case, the service 302 may retry failed operations up to 6 times during execution of the requested function. In addition, the execution budget applies not only to the service 302, but to any supporting services in the application graph 300 called during execution of the function, such that the entire application graph 300 is subject to the single execution budget of 6 retries.

Figure 4:
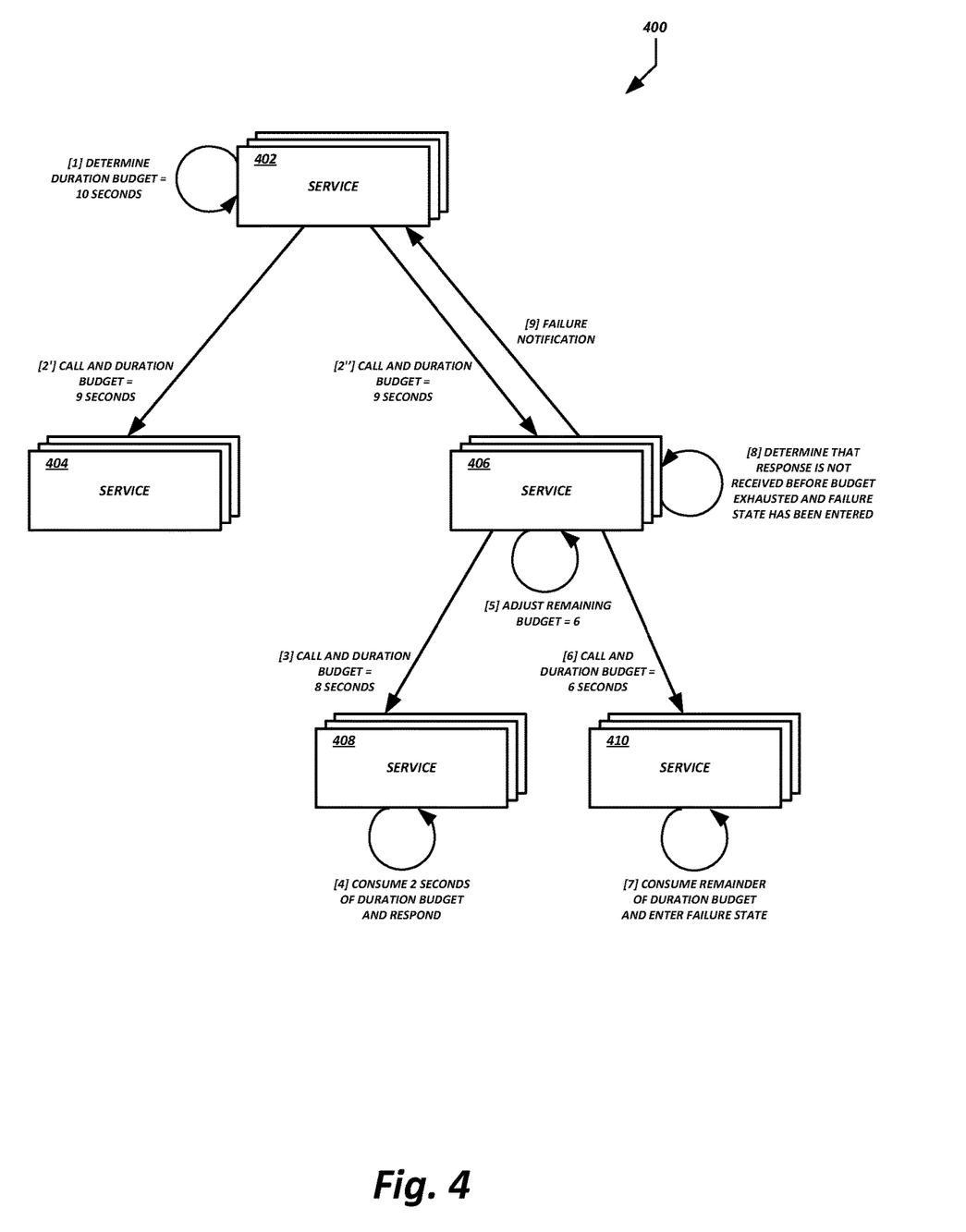
FIG. 4 is a block diagram of illustrative data flows and interactions during execution of a distributed computing task using an execution duration budget according to some embodiments.

FIG. 4 shows an example in which a service 402 can determine at [1] that the execution budget is an execution duration budget with 10 seconds. In this case, the service 402 may perform operations associated with execution of the requested function for a maximum of 10 seconds. In addition, the execution budget applies not only to the service 402, but to any supporting services in the application graph 400 called during execution of the function, such that the entire application graph 300 is subject to the single execution budget of 10 seconds.

At block 206, the computing device 500 can perform one or more operations associated with execution of the requested function. For example, the computing device 500 may process data received with—or otherwise accessed in connection with—the request to execute the function, prepare output data, and the like.

At decision block 208 the computing device 500 can determine whether the execution budget has been exhausted and there is additional execution budget required (e.g., an additional retry or additional execution time). If the execution budget has been exhausted and additional budget for further operations is required, the process 200 may proceed to block 210, where a failure state is entered. The failure state may result in termination of the application graph, termination of the requested computing task, notification to the requestor, some other operation, some combination thereof, etc. Otherwise, if the execution budget has not been exhausted (or if it has been exhausted but no additional budget is currently required), then the process 200 may proceed to decision block 212.

Illustratively, if the execution budget is an execution retry budget, the budget may be exhausted if the number of failed computing operations that have been retried is equal to the number of operations provided in the execution budget. For example, if the computing device 500 received an execution retry budget of 6 and has since retried 6 failed operations, the execution retry budget has been exhausted. If a subsequent operation has failed that the computing device 500 is to retry, the computing device 500 can determine whether the execution budget is exhausted. In example, the execution budget has indeed been exhausted and an additional retry is needed. Therefore, the process 200 can proceed to block 210.

If the execution budget is an execution duration budget, the budget may be exhausted if the total amount of time used by the computing device 500 is equal to the duration of time provided in the execution budget. For example, if the computing device 500 received an execution duration budget of 10 seconds and has since spent 10 seconds performing operations, the execution duration budget has been exhausted. If additional time is needed, the process 200 can proceed to block 210.

At decision block 212, the computing device 500 can determine whether execution of the function includes calling one or more other services to perform one or more additional functions. If so, the process 200 can proceed to block 214. Otherwise, the process 200 can terminate at block 220. In the example shown in FIG. 3, the service 302 is to call two other services: services 304 and 306. In the example shown in FIG. 4, the service 402 is to call two other services: 404 and 406. In each of these cases, the process performed by the services 302 and 402 would proceed to block 214.

At block 214, the computing device 500 can determine an execution budget for the service(s) to be called. The execution budget determined for a particular called service may depend on one or more factors, such as the type of execution budget (e.g., whether the execution budget is an execution retry budget or an execution duration budget), whether there are multiple services to be called, whether the multiple services are to be called in series or in parallel (or otherwise asynchronously), and the like.

As shown in FIG. 3, service 302 may be calling services 304 and 306 to execute in parallel. In addition, the execution budget is an execution retry budget. In this case, the service 302 may allocate the currently-available execution budget (6 retries) among the two services 304, 306, with each of the two services 304, 306 receiving a portion of the available execution retry budget. The services 304, 306 may each receive only a portion of the available execution retry budget because they are to execute in parallel and collectively cannot exceed the total available execution retry budget. Thus, they are each provided with only a portion of the available execution retry budget to ensure that they do not collectively exceed the total available execution retry budget. The allocation of available execution retry budget among the services 304 and 306 to be called in parallel may be an equal allocation in which each of the services 304, 306 is provided with an equal share of the available execution budget (e.g., each is provided with 3 retries in this example). In some embodiments, the allocation may be asymmetric, with one service receiving a larger share of the available execution budget than the other service (e.g., service 304 is allocated 4 retries, and service 306 is allocated 2 retries). The asymmetric allocation may be based on dynamically determined execution factors, characteristics of the services, or the like. For example, a service may be provided with a larger share of the available execution retry budget if that service is expected to make more calls to additional services, perform more operations, encounter more network latency, perform more important operations, etc.

As shown in FIG. 4, service 402 may be calling services 404 and 406 to execute in parallel. In addition, the execution budget is an execution duration budget. In this case, the service 402 may provide the entire currently-available execution budget or some portion thereof (e.g., 9 seconds) to the two services 404, 406. Even though the services 404, 406 are to execute in parallel, they may each receive the entire currently-available execution budget (or a portion determined by the calling service 402) because the execution duration specified by the execution duration budget is time-based rather than based on a quantity of operations. Thus dozens, hundreds, or more services may each execute in parallel (and potentially retry failed operations a large number of times) within the budgeted duration of time. The consumption of time during the operation of one service does not necessarily reduce the time allotted to another service operating in parallel.

At block 216, the computing device 500 can initiate calls to the services to be called. The initiation of calls may include passing the execution budgets determined at block 214. The called services may perform operations, including calling additional services, consuming some or all of the execution budgets that have been provided, and the like. In some embodiments, each time a service is called, that service may begin an instance of the process 200 of its own, such that execution of a single computing task by a single application graph may involve multiple recursive or iterative executions of the process 200, or portions thereof.

At block 218, the computing device 500 can receive a response from the service(s) called at block 216. A response may include requested data, generated output, an error message, or the like. In some embodiments, the response may include or be associated with remaining budget data representing a remainder of an execution budget that was provided to the called service. For example, the response may include retry budget data representing the remainder of the retry budget that was provided to the service (e.g., minus any retries used by the called service, plus any retries added by the called service based on budget addition rules, etc.). In some embodiments, the called service may simply return to the calling service. For example, the return may or may not be accompanied by a confirmation of successful execution or an indication of unsuccessful execution.

As shown in FIG. 3, service 302 may call services 304 and 306 at [B'] and [B"], respectively, such that the services 304 and 306 execute at least partially in parallel. During the course of operation, service 304 may attempt to call service 308 at [C], and that attempt may fail. For example, service 304 may attempt to establish a connection to service 308 to make the call, and the connection may timeout, be lost, or experience some other failure. In response to the failure, the service 304 may determine whether there are sufficient retries available in the execution retry budget. If there are no retries remaining in the execution retry budget, then service 304 may send an error message to calling service 302, terminate execution, or the like. Otherwise, if there are retries available in the execution retry budget, service 304 can reduce the execution retry budget at [D] and retry the operation at [E]. If service 304 successfully connects to and invokes service 308 at [E], the remainder of the execution retry budget may be provided to service 308. In the present example, if only one retry was used by service 304, then an execution retry budget of 2 may remain and be provided to service 308.

During the course of operation, service 308 may determine to make calls of its own to additional services 310, 312. In this case, rather than make the calls to the services 310 and 312 such that they execute at least partially in parallel, service 308 may instead call services 310, 312 in series such that their execution does not overlap. As shown, service 308 may call service 310 first at [F], and wait for service 310 to complete execution before service 308 calls service 312. Service 308 may therefore provide the entire available execution retry budget (or some portion thereof) to service 310 because there is no risk that the two services 310 and 312 will collectively exceed the execution retry budget during parallel operation. As shown, service 310 may consume a portion of the retry budget (e.g., retry one failed operation) at [G]. When service 308 receives a response from service 310, service 308 may determine at [H] the remaining execution retry budget based on the portion of the execution retry budget consumed by service 310. For example, service 310 may provide a response to service 308 indicating the amount of the execution retry budget consumed by service 310. The remaining execution retry budget may be the execution retry budget that was provided to service 310, less any retries consumed by service 310 during operation and any retries subsequently consumed by service 308 prior to successfully calling service 312. Service 308 may then provide the entire remaining execution retry budget (e.g., 1 retry) to service 312 when service 308 calls service 312 at [I].

As shown in FIG. 4, service 402 may call services 404 and 406 at [2'] and [2"], respectively, such that services 404 and 406 execute at least partially in parallel. During the course of operation, service 406 may determine to make calls of its own to additional services 408, 410. In this case, rather than make the calls to the services 408, 410 such that they execute at least partially in parallel, service 406 may instead call services 408, 410 in series such that their execution does not overlap. As shown, service 406 may call service 408 first at [3], and wait for service 408 to complete execution and potentially consume some or all of the execution duration budget at [4]. At [5], service 406 can determine that service 408 has consumed a portion of the provided execution duration budget. For example, service 406 may maintain data regarding a start time that it called service 408. When a response is received from service 408 (or upon occurrence of some other event), service 406 can determine at [5] how much execution duration budget was consumed and then adjust how much execution duration budget remains before service 406 calls service 410 at [6]. Service 406 may then provide the entire remaining execution duration budget (or some portion thereof) to service 410 when service 406 calls service 410 at [6].

Returning to FIG. 2, after receiving responses from any called services at block 218 or otherwise determining that execution of the called services has completed or been terminated, the computing device 500 can return to decision block 208 to determine whether the execution budget has been exhausted and additional execution budget is required to perform further operations. If the budget has been exhausted and further operations are required, the process 200 may proceed to block 210, where a failure state is entered. The failure state may result in termination of the application graph, termination of the requested computing task, notification to the requestor, some other operation, some combination thereof, etc. Otherwise, if the execution budget has not been exhausted (or if it has, but no further execution budget is determined to be needed), then the process 200 may proceed to decision block 212, as needed.

As shown in FIG. 4, during the course of operation, service 410 may consume at [7] the entire execution duration budget that it has been provided, and may have remaining operations to perform or otherwise may require additional time to complete the operations that it is performing. In this situation, because the execution duration budget has been exhausted without service 410 completing all of its operations, service 410 may fail. In some embodiments, service 406 may determine at [8] that the failure has occurred due to not receiving a response in the time allotted to service 410 in the execution duration budget. For example, service 406 may maintain data regarding a start time that it called service 410. When a response is not received from service 410 within a period of time that begins at the start time and proceeds for the extent of the execution duration budget that was available to service 410 (e.g., 6 seconds in the illustrated example), service 406 can determine that a failure state has been entered. In response to the failure, service 406 may send an error message to calling service 402 at [9], terminate execution, or the like. In some embodiments, service 410 may provide an error message to service 406, and the failure may be passed up the application graph 400 to the original calling service 402. In some embodiments, error messages may or may not be passed up the application graph 400, but calling services may nevertheless determine that an error has occurred based on their own tracking of execution duration budgets.

Additional Embodiments

Although the application graphs 300, 400 shown in FIGS. 3 and 4 include certain ranges and combinations of services, branches, parallel operations, sequential operations, failures, retries, execution budget determinations and adjustments, and interactions between services, the figures and description thereof are provided for illustrative purposes only. In some embodiments, an application graph may have: fewer or additional services; fewer or additional branches; fewer or additional parallel and/or in-series service calls; fewer or additional failures and retries; different budget determinations or adjustments; fewer, additional, or alternative interactions between services; etc.

In some embodiments, a computing task may be performed using multiple execution budgets as independent controls on execution, rather than only using an execution retry budget or execution duration budget. For example, a service that receives a request may also receive—or separately determine—both an execution retry budget and an execution duration budget. When either budget is exhausted and additional budget would be needed to successfully complete (or attempt to successfully complete) the computing task, then failure may occur. In this way, each of the budgets may serve as a control on execution.

In some embodiments, an execution rule may be used and passed to called/calling services in addition to an execution budget. The execution rule may specify how the execution budget is to be consumed, or otherwise how operations that affect the execution budget are to be performed. For example, an execution rule may relate to the timing of retry operations, such as by using an exponential back-off algorithm to determine how long to wait before retrying a failed operation and consuming a portion of the execution retry budget. A service may experience a failure and use the exponential back-off algorithm to determine when to initiate a retry operation. Subsequent retry operations may be delayed for increasingly longer periods of time. In this case, the service may then pass execution rule data representing the current back-off period or next back-off period to be used, in addition to passing execution retry budget data representing a quantity of retries.

In some embodiments, an execution budget may be adjusted in a quantity that is different than the quantity consumed to perform a task. When the execution budget is an execution retry budget, performing a single retry of a failed operation may not necessarily reduce the execution budget by 1. Instead, the service that is performing the retry operation may reduce the execution budget by an amount different than 1 based on satisfaction of one or more criteria. For example, if the operation being retried is relatively resource intensive compared to other operations, then the execution retry budget may be reduced by a multiple of 1 (e.g., using a weighing factor, a table mapping values to operations, etc.). As another example, if the operation being retried is not resource intensive or is important to complete successfully, the execution retry budget may be reduced by a fraction of 1 (e.g., using a weighing factor, a table mapping values to operations, etc.). When the execution budget is an execution duration budget, executing for a particular period of time may not necessarily reduce the execution budget by exactly the particular period of time. Instead, the service that is performing the operation may reduce the execution budget by a different amount based on satisfaction of one or more criteria. For example, if the operation being performed is relatively important, then the execution duration budget may be reduced by a fraction of the actual execution time (e.g., using a weighing factor, a table mapping values to operations, etc.).

In some embodiments, a service may add to an execution budget during the course of operation and/or in response to an event or the satisfaction of one or more criteria. The execution budget may be increased to improve the likelihood that the computing task will complete successfully, to preserve work that has been performed successfully, etc. For example, a computing task may have reached a point where the amount of work that has been completed is significant and it is undesirable to start over or otherwise discard the work, even though some (or most, or all) of the execution budget has been consumed. In this case, services may be configured to dynamically increase the remaining execution budget (e.g., add retries or time) to increase the likelihood that the computing task will complete and the significant amount of completed work is not lost. As another example, the execution budget may be set low initially so that a failure or relatively small number of failures at or near the beginning of the computing task will result in termination of the computing task. As the computing task progresses (e.g., reaches checkpoints, results in a threshold amount of output being generated, etc.), the execution budget can be increased.

In some embodiments, the execution budget for a computing task may be specified by the entity that initiates the computing task. A configuration setting may be provided whereby the execution budget (e.g., the execution duration) may be specified ahead of time, such as by an administrator, as part of a service level agreement, or the like. Additionally, or alternatively, the execution budget may be specified as part of the request to execute the computing task. For example, when an API is made to the distributed computing system causing the invocation of a service, the API call may include, as a parameter, execution budget data specifying the execution duration for the requested task.

Example Computing Device Components

FIG. 5 shows components of an illustrative computing device 500 that may be used to implemented aspects of the present disclosure. In some embodiments, a service of a distributed computing system may be implemented using one or more computing devices 500.

As shown, the computing device 500 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SDDs"), flash drives, and/or other persistent non-transitory computer-readable media; one or more input/output device interfaces 508, and one or more computer readable memories 510, such as random access memory ("RAM") and/or other volatile non-transitory computer-readable media. The computer readable memory 510 may include computer program instructions that the computer processor 502 executes in order to implement one or more embodiments. For example, the computer readable memory 510 can store an operating system 512 that provides computer program instructions for use by the computer processor 502 in the general administration and operation of the computing device 500. The computer readable memory 510 may also include distributed service instructions 514 for implementing features of the service, such as performing the process 200 shown in FIG. 2. The computer readable memory may also include an execution budget storage 516 to store the current status of the execution budget, such as the amount of retries/time/etc. remaining in the execution budget.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a computer processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A computer processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for managing distributed execution of computing services, comprising a plurality of services implemented by one or more computing devices;
wherein a first service of the plurality of services is configured to:
receive a first request to execute a first function, wherein the first request is associated with first retry budget data representing a first maximum number of communication retry attempts permitted in response to inter service communication failures, and wherein execution of the first function comprises sending, to a second service of the plurality of services, a second request to execute a second function;
determine that a first attempt to communicate with the second service has failed;
determine that the first maximum number of communication retry attempts has not been exhausted;
generate second retry budget data based at least partly on reducing the first maximum number of communication retry attempts, wherein the second retry budget data represents a second maximum number of communication retry attempts;
determine that a second attempt to retry communicating with the second service has been successful; and
send the second request to the second service, wherein the second request is associated with the second retry budget data, and wherein execution of the second function comprises sending a third request to a third service of the plurality of services; and
wherein the second service is configured to:
determine that a third attempt to communicate with the third service has failed;
determine that the second maximum number of communication retry attempts has been exhausted; and
send an error notification to the first service.

2. The system of claim 1, wherein the first service comprises one of: a first virtual machine executing on a host computing device, a first application executing on the host computing device, or a first thread executing on the host computing device; and wherein the second service comprises one of a second virtual machine executing on a host computing device, a second application executing on the host computing device, or a second thread executing on the host computing device.

3. The system of claim 1, further comprising a communication network, wherein the first attempt to communicate with the second service comprises an attempt to establish a connection with a first computing device of the second service via the communication network, and wherein the first service is configured to determine that the second attempt to communicate with the second service is to be an attempt to establish the connection with a second computing device of the second service via the communication network based at least partly on a failure of the first attempt.

4. The system of claim 1, wherein the first request is further associated with first duration budget data representing a maximum duration of time for execution of the first function.

5. A computer-implemented method comprising:
under control of a first computing service comprising one or more computing devices configured to execute specific instructions,
receiving a first request to execute a first function of a plurality of functions, wherein the first request is associated with first execution budget data representing a first execution budget of retry attempts for performing one or more operations during execution of the first function, and wherein the first execution budget is different from a maximum permitted quantity of retry attempts associated with execution of the plurality of functions;
determining that execution of the first function comprises requesting a second computing service to execute a second function of the plurality of functions;
generating second execution budget data representing a second execution budget of retry attempts for performing one or more operations during execution of the second function, wherein the second execution budget data is generated based at least partly on the first execution budget data and a quantity of retry attempts performed during execution of the first function, and wherein the second execution budget is different from the maximum permitted quantity of retry attempts associated with execution of the plurality of functions; and
generating a second request to the second computing service to execute the second function, wherein the second request is associated with the second execution budget data.

6. The computer-implemented method of claim 5, further comprising updating the first execution budget data based at least partly on removing, from the first execution budget, a portion of the first execution budget consumed during at least a portion of the one or more operations performed during execution of the first function, wherein the second execution budget data is generated subsequent to updating the first execution budget data.

7. The computer-implemented method of claim 5, further comprising:
determining that execution of the first function further comprises requesting a third computing service to execute a third function concurrently with execution of at least a portion of the second function by the second computing service;
generating third execution budget data representing a third execution budget for performing one or more operations during execution of the third function; and
allocating, among at least the second execution budget and the third execution budget, at least a portion of the first execution budget.

8. The computer-implemented method of claim 5, wherein generating the second execution budget data further comprises determining a maximum duration of time for execution of the second function.

9. The computer-implemented method of claim 8, further comprising:
   determining that execution of the first function further comprises requesting a third computing service to execute a third function concurrently with execution of at least a portion of the second function by the second computing service; and
   generating third execution budget data representing a third execution budget for performing one or more operations during execution of the third function, wherein the third execution budget comprises a maximum duration of time specified by the first execution budget data less a duration of time consumed by the first computing service during a portion of the one or more operations performed during execution of the first function.

10. The computer-implemented method of claim 5, further comprising:
    determining that execution of a portion of the one or more operations during execution of the first function satisfies a criterion; and
    generating updated first execution budget data by adding to the first execution budget.

11. The computer-implemented method of claim 5, further comprising:
    receiving, from the second computing service, remaining budget data representing a remainder of the second execution budget; and
    generating third execution budget data representing a third execution budget for performing one or more operations during execution of a third function, wherein the third execution budget data is generated based at least partly on the remaining budget data.

12. A computing system comprising computer-readable memory and one or more computer processors, wherein the computing system is configured to at least:
    receive a first request to execute a first function of a plurality of functions, wherein the first request is associated with first execution budget data representing a first execution budget of retry attempts for performing one or more operations during execution of the first function, and wherein the first execution budget is different from a maximum permitted quantity of retry attempts associated with execution of the plurality of functions;
    determine that execution of the first function comprises requesting a second computing system to execute a second function of the plurality of functions;
    generate second execution budget data representing a second execution budget of retry attempts for performing one or more operations during execution of the second function, wherein the second execution budget data is generated based at least partly on the first execution budget data and at least a portion of the one or more operations performed during execution of the first function, and wherein the second execution budget is different from the maximum permitted quantity of retry attempts associated with execution of the plurality of functions; and
    generate a second request to the second computing system to execute the second function, wherein the second request is associated with the second execution budget data.

13. The computing system of claim 12, further configured to update the first execution budget data based at least partly removing, from the first execution budget, a portion of the first execution budget consumed during at least a portion of the one or more operations performed during execution of the first function, wherein the second execution budget data is generated subsequent to updating the first execution budget data.

14. The computing system of claim 12, further configured to:
    determine that execution of the first function further comprises requesting a third computing system to execute a third function concurrently with execution of at least a portion of the second function by the second computing system;
    generate third execution budget data representing a third execution budget for performing one or more operations during execution of the third function; and
    allocate, among at least the second execution budget and the third execution budget, at least a portion of the first execution budget.

15. The computing system of claim 12, wherein the second execution budget data further comprises a maximum duration of time for execution of the second function.

16. The computing system of claim 15, further configured to:
    determine that execution of the first function further comprises requesting a third computing system to execute a third function concurrently with execution of at least a portion of the second function by the second computing system; and
    generate third execution budget data representing a third execution budget for performing one or more operations during execution of the third function, wherein the third execution budget comprises a maximum duration of time specified by the first execution budget less a duration of time consumed by the computing system during the portion of the one or more operations performed during execution of the first function.

17. The computing system of claim 12, further configured to:
    determine that execution of the portion of the one or more operations during execution of the first function satisfies a criterion; and
    generate updated first execution budget data by adding to the first execution budget.

18. The computing system of claim 12, further configured to:
    receive, from the second computing system, remaining budget data representing a remainder of the second execution budget; and
    generate third execution budget data representing a third execution budget for performing one or more operations during execution of a third function, wherein the third execution budget data is generated based at least partly on the remaining budget data.

* * * * *